United States Patent [19]

Nohara

[11] Patent Number: 4,998,170
[45] Date of Patent: Mar. 5, 1991

[54] DIRECT CURRENT RESTORER

[75] Inventor: Kazunori Nohara, Osaka, Japan

[73] Assignee: Sanyo Electric Co., Ltd., Moriguchi, Japan

[21] Appl. No.: 436,590

[22] Filed: Nov. 15, 1989

[30] Foreign Application Priority Data

Nov. 19, 1988 [JP] Japan .................. 63-293120

[51] Int. Cl.⁵ .............................. H04N 5/16
[52] U.S. Cl. ...................... 358/171; 358/172
[58] Field of Search .............. 358/171, 172, 168, 34

[56] References Cited

U.S. PATENT DOCUMENTS

| | | | |
|---|---|---|---|
| 4,293,874 | 10/1981 | Reneau | 358/172 |
| 4,549,214 | 10/1985 | Hinn | 358/172 |
| 4,630,116 | 12/1986 | Isogawa | 358/171 |
| 4,631,589 | 12/1986 | Hongu | 358/171 |

FOREIGN PATENT DOCUMENTS 53-126817 11/1978 Japan .
55-33365 3/1980 Japan .
60-124184 7/1985 Japan .

Primary Examiner—Tommy P. Chin
Attorney, Agent, or Firm—Armstrong, Nikaido, Marmelstein, Kubovcik & Murray

[57] ABSTRACT

A direct current restorer applied to a pedestal clamp circuit of a television receiver in which an input video signal is compared with a pedestal level setting reference signal for every pedestal period, and, based on difference between the pedestal level of the input video signal and the level of the reference signal, the direct current level of the input video signal is shifted. In this direct current restorer, a direct current according to the level variation of the reference signal may be superposed on the input video signal so that the direct current level of the input video signal is corrected according to the level variation of the reference signal. Accordingly, when adjusting the pedestal level or achieving a liquid crystal display in which the polarity of the input video signal is periodically inverted, a direct current according to the level variation of the reference signal may be superposed on the input video signal. Thus, the pedestal level of the input video signal may quickly follow the level variation of the reference signal and may be controlled to the level of the reference signal with no influence exerted onto the comparison in level of the input video signal with the reference signal.

4 Claims, 6 Drawing Sheets

DIRECT CURRENT RESTORER

FIELD OF THE ART

The present invention relates to a video signal direct current restorer.

BACKGROUND OF THE INVENTION

As shown in, for example, Japanese Laid-Open Patent Publication No. 53-126817 (H04N 5/4), a conventional television receiver is so arranged that a direct current restorer having an arrangement as substantially shown in FIG. 6, shifts the direct current level of a video signal such as a television signal, a three-primary-color signal or the like, thereby to maintain constant the pedestal level of the video signal.

More specifically, a video signal shown in FIG. 7 entered to an input terminal 1, is entered to the base of a transistor 5 of a comparator 4 through a transistor 2 and a resistance 3. A pedestal level setting reference signal having a voltage set by a variable resistance 7 is entered to the base of a transistor 6 forming a differential pair together with the transistor 5.

A constant-current source 8 in a common emitter circuit of the transistors 5, 6 is turned ON for every pedestal period, based on a clamp pulse of a video signal. The comparator 4 compares the pedestal level of the video signal with the level of the reference signal. According to difference in level between both signals, a transistor 9 is turned ON and a capacitor 10 is charged with a voltage corresponding to the difference in level between both signals. Thus, the difference in level is held.

Based on the charging voltage of the capacitor 10, a transistor 11 is turned ON. According to a resistance value across the collector and the emitter of the transistor 11, the video signal is shifted in direct current level. The video signal of which pedestal level is clamped as constant, is supplied to an output terminal 12.

In FIG. 6, a power terminal and a bias resistance are generally designated by reference numerals 13 and 14, respectively.

When displaying an image on a CRT, the variable resistance 7 is changed to adjust the pedestal level of the video signal.

For a liquid crystal television receiver or the like for displaying an image on a liquid crystal panel, the liquid crystal panel is generally driven by an alternating current. Accordingly, the video signal entered into the direct current restorer is inverted for every line or for every field.

In the direct current restorer applied to a liquid crystal panel drive circuit in a liquid crystal television receiver or the like, it is required that, based on the video signal of which polarity is inverted as shown in, for example, FIG. 8, the level of the reference signal is switched synchronously with such polarity inversion.

The Japanese Laid-Open Patent Publication No. 55-33365 (H04N 5/16) discloses a direct current restorer comprising a comparator for comparing a difference in level between an input video signal and a reference signal, a sample-hold circuit for holding an output signal from the comparator, and an adder for adding an output signal from the sample-hold circuit, to the input video signal.

Also in the direct current restorer disclosed by this Publication, the direct current level of the video signal is shifted in a manner similar to that in the direct current restorer in FIG. 6.

The Japanese Laid-Open Patent Publication No. 60-124184 (H04N 5/66) discloses a direct current restorer in which an alternating current output of an input video signal is superposed on a direct current passing through a variable resistance, thereby to maintain constant the pedestal level of the input video signal.

The conventional direct current restorer in FIG. 6 presents the problem outlined below. That is, the control period of the transistor 9 is limited to the pedestal period and the charging voltage of the capacitor 10 is gradually changed. Accordingly, even though the reference signal level is changed according to the variation of the set value of the pedestal level, the polarity inversion of the video signal and the like, the variation of the shifted amount of the direct current level does not quickly follow the level variation of the reference signal. Therefore, the control of the pedestal level of the video signal at the output terminal 12 is delayed, failing to achieve a stable direct current restoration.

In particular, when the direct current restorer in FIG. 6 is applied to a liquid crystal panel drive circuit, the polarity of the input video signal is inverted in a short period of time for every line or for every field, and the level of the reference signal varies in a relatively considerable amount due to the polarity inversion. Accordingly, the pedestal level cannot be adjusted in a stable manner to deteriorate the display driving characteristics and the like of the liquid crystal panel.

The direct current restorer disclosed by the Japanese Laid-Open Patent Publication No. 55-33365 above-mentioned also presents a problem similar to that above-mentioned.

The direct current restorer disclosed by the Japanese Laid-Open Patent Publication No. 60-124184 above-mentioned, cannot be disadvantageously used when the polarity of the input video signal is periodically inverted.

OBJECTS OF THE INVENTION

The present invention provides a direct current restorer which quickly follows the level variation of a reference signal accompanied by a change in pedestal level and polarity inversion of an input video signal, so that the pedestal level of the input video signal is controlled to the level of the reference signal, achieving a stable direct current restoration.

DISCLOSURE OF THE INVENTION

The present invention provides a direct current restorer in which an input video signal is compared with a pedestal level setting reference signal for every pedestal period, and, based on difference between the pedestal level of the input video signal and the level of the reference signal, the direct current level of the input video signal is shifted. In accordance with the present invention, the direct current restorer comprises direct current superposing means for superposing a direct current according to the level variation of the reference signal, on the input video signal, so that the direct current level of the input video signal is corrected according to the level variation of the reference signal.

According to the direct current restorer of the present invention, when the reference signal undergoes a change in level, a direct current according to such a change is superposed on the input video signal. Accordingly, the pedestal level of the input video signal may quickly follow the level variation of the reference signal and may be controlled to the level of the reference signal with the level variation of the reference signal exerting no influence on the amount of shift in the direct current level based on the comparison in level of the input video signal with the reference signal for every pedestal period.

The direct current superposing means includes a variable resistance for adjusting the level of the reference signal, and a current mirror circuit for superposing a direct current according to an adjustment value of the variable resistance, on the input video signal. Accordingly, when the variable resistance is adjusted to change the pedestal level, a direct current according to such a change is superposed on the input video signal so that the pedestal level may be quickly changed.

According to the direct current restorer of the present invention, there is further disposed, at a primary stage, a polarity inverting circuit for periodically inverting the polarity of the input video signal, and the direct current superposing means includes (i) reference signal changing means formed by a differential pair of transistors for changing the level of the reference signal, synchronously with inversion of the polarity of the input video signal, and (ii) a current mirror circuit for superposing a direct current according to an output of the reference signal changing means, on the input video signal. Accordingly, the direct current to be superposed on the input video signal undergoes a change according to the level variation of the reference signal accompanied by the periodical inversion of the polarity of the input video signal. When the direct current restorer of the present invention is applied to a drive circuit for a liquid crystal panel in a liquid crystal television receiver or the like, a stable direct current restoration may be achieved.

The reference signal changing means includes a differential pair of transistors of which output variation directions are reverse to each other, and a bias adjusting variable resistance for changing the bias settings of the differential pair of transistors, thereby to adjust the variation direction of the direct currents in the current mirror circuit and the reference signal according to the change in the polarity of the input video signal. By adjusting the variable resistance, the variation characteristics of the reference signal and the input video signal may be changed according to, for example, the type of a liquid crystal panel. Thus, the direct current restorer of the present invention may be used as a drive circuit for both liquid crystal panels of the normally white type and the normally black type.

BRIEF DESCRIPTION OF THE DRAWINGS

FIG. 1 is a connection diagram of the first embodiment;

FIG. 2 is a connection diagram of the second embodiment;

FIG. 3 (a) and (b) show waveforms for illustrating the operation of the diagram in FIG. 2;

FIG. 4 is a connection diagram of the third embodiment;

FIG. 5 (a) to (c) show waveforms for illustrating the operation of the diagram in FIG. 4;

PREFERRED EMBODIMENTS OF THE PRESENT INVENTION

First Embodiment

Figure 1:
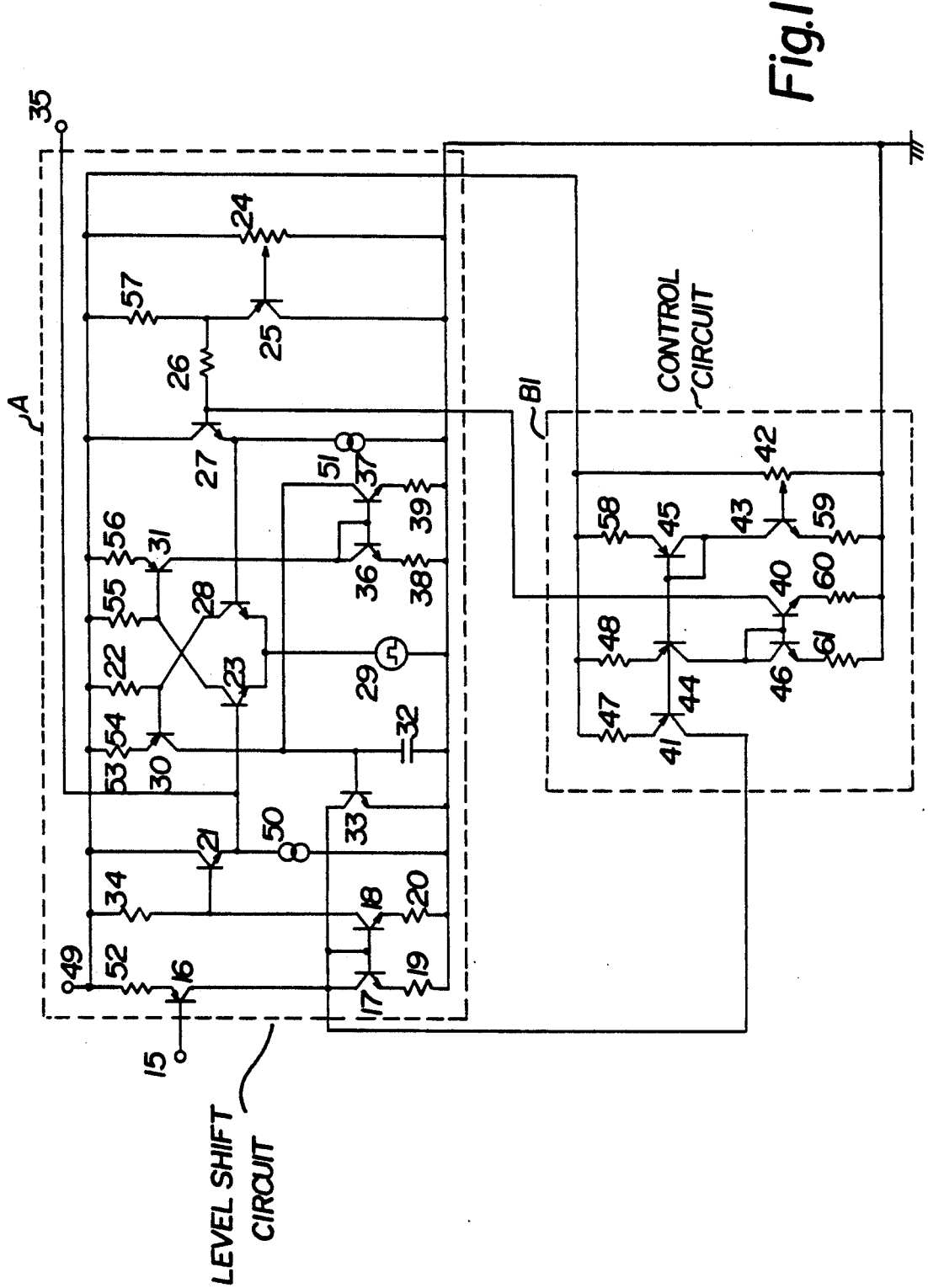
FIG. 1 to FIG. 5 show direct current restorers in accordance with first, second and third embodiments of the present invention.

The following description will discuss the first embodiment of the present invention with reference to FIG. 1. ranged as to make a CRT display in which the polarity of an input video signal is not inverted.

Figure 7:
FIG. 7 and FIG. 8 show waveforms of a video signal.

When an input video signal, for example, as shown in FIG. 7 is entered to the base of a transistor 16 in a level shift circuit A through an input terminal 15, the input video signal passes through a current mirror circuit of transistors 17, 18 and resistances 19, 20, and a transistor 21 forming a buffer amplifier. The input video signal is then entered into a transistor 23 serving as one transistor of a differential pair which forms a comparator 22.

On the other hand, a reference signal set by a variable resistance 24, i.e., a pedestal level setting reference signal, is entered into the base of a transistor 28 serving as the other transistor of the comparator 22 through a transistor 25 forming a buffer amplifier, a resistance 26 and a transistor 27 forming a buffer amplifier.

Based on a clamp pulse of the input video signal, a constant-current source 29 in a common emitter circuit of the transistors 23, 28 is turned ON and the comparator 22 is operated for every pedestal period of the input video signal.

At this time, when the level of the input video signal at the base of the transistor 23 is lower than the level of the reference signal at the base of the transistor 28, the base voltage of a transistor 30 is lowered and the base voltage of a transistor 31 is increased according to the difference in level between both signals above-mentioned.

Based on the decrease in the base voltage of the transistor 30, the charging voltage of a holding capacitor 32 is increased and the base voltage of a transistor 33 is increased. Then, a current in the current mirror circuit is decreased and a drop in voltage of a resistance 34 in the base circuit of the transistor 21 is decreased. The emitter voltage of the transistor 21 is increased and the direct current level of the video signal supplied to an output terminal 35 is increased.

On the other hand, when the level of the input video signal at the base of the transistor 23 is higher than the level of the reference signal at the base of the transistor 28, the base voltage of the transistor 30 is increased and the base voltage of the transistor 31 is decreased according to the difference in level between both signals above-mentioned.

Based on the decrease in the base voltage of the transistor 31, the current in a current mirror circuit of transistors 36, 37 and resistances 38, 39 is decreased, and the drop in voltage of the resistance 34 is increased. The emitter voltage of the transistor 21 is decreased, and the direct current level of the video signal supplied to the output terminal 35 is increased.

By a change in the emitter voltage of the transistor 21 based on the operation of the comparator 22 for every pedestal period, the video signal at the output terminal 35 is controlled to a signal in which the pedestal level of the input video signal is being shifted to the level of the preset reference signal.

To superpose a direct current according to level variation of the reference signal, on the input video signal, the base of the transistor 27 is connected to the collector of a transistor 40 in a control circuit B1 forming direct current superposing means, and the collector of the transistor 16 is connected to the collector of a transistor 41 in the control circuit B1.

When a variable resistance 42 for adjusting the level of the reference signal is adjusted to change the reference signal level from the level set by the variable resistance 24, a current flowing in a transistor 43 for a constant-current source varies according to a value adjusted by the variable resistance 42.

Further, a current in transistors 41, 44, 45 forming a current mirror circuit varies in proportion to a change in the current of the transistor 43.

The current in the transistor 44 flows in a transistor 46. At this time, by a current mirror circuit of the transistors 46, 40, a current flowing in the transistor 40, i.e., a current supplied from the base of the transistor 27 varies in proportion to a change in the current of the transistor 43.

When the current flowing in the transistor 40 is increased, a drop in voltage of the resistance 26 is increased. This lowers the base voltage of the transistor 27 and the level of the reference signal of the base of the transistor 28.

On the other hand, the current flowing in the transistor 41 is superposed on the input video signal through the current mirror circuit of the transistors 17, 18.

When the current flowing in the transistor 40 is increased, the current flowing in the transistor 41 is also increased. At this time, based on an increase in the direct current superposed from the transistor 41, a drop in the voltage of the resistance 34 is increased and the base voltage of the transistor 21 is decreased. This decreases the level of the input video signal at the base of the transistor 23.

Provision is made such that the drops in the voltages of the resistances 26, 34 due to variation of the variable resistance 42 are equal to each other by adjusting the resistance values of the resistances 26, 34 or the resistance values of the resistances 47, 48 of the emitters of the transistors 41, 44. Accordingly, the level of the reference signal and the direct current level of the input video signal are interlockingly changed in the same amount.

Since the control circuit B1 is continuously controlled, the direct current level of the input video signal varies according to the level variation of the reference signal. As a result, the level variation of the reference signal exerts no influence to the amount of level shift in the level shift circuit A for every pedestal period.

Accordingly, the video signal at the output terminal 35 is changed with the direct current level thereof quickly following the level variation of the reference signal. Further, based on the result of comparison made by the comparator 22 for every pedestal period, the pedestal level of the input video signal is controlled, in a stable manner, to the level of the reference signal.

In. FIG. 1, there are also disposed a power terminal 49, constant-current sources 50, 51 and bias resistances 52 to 61.

Second Embodiment

Figure 2:
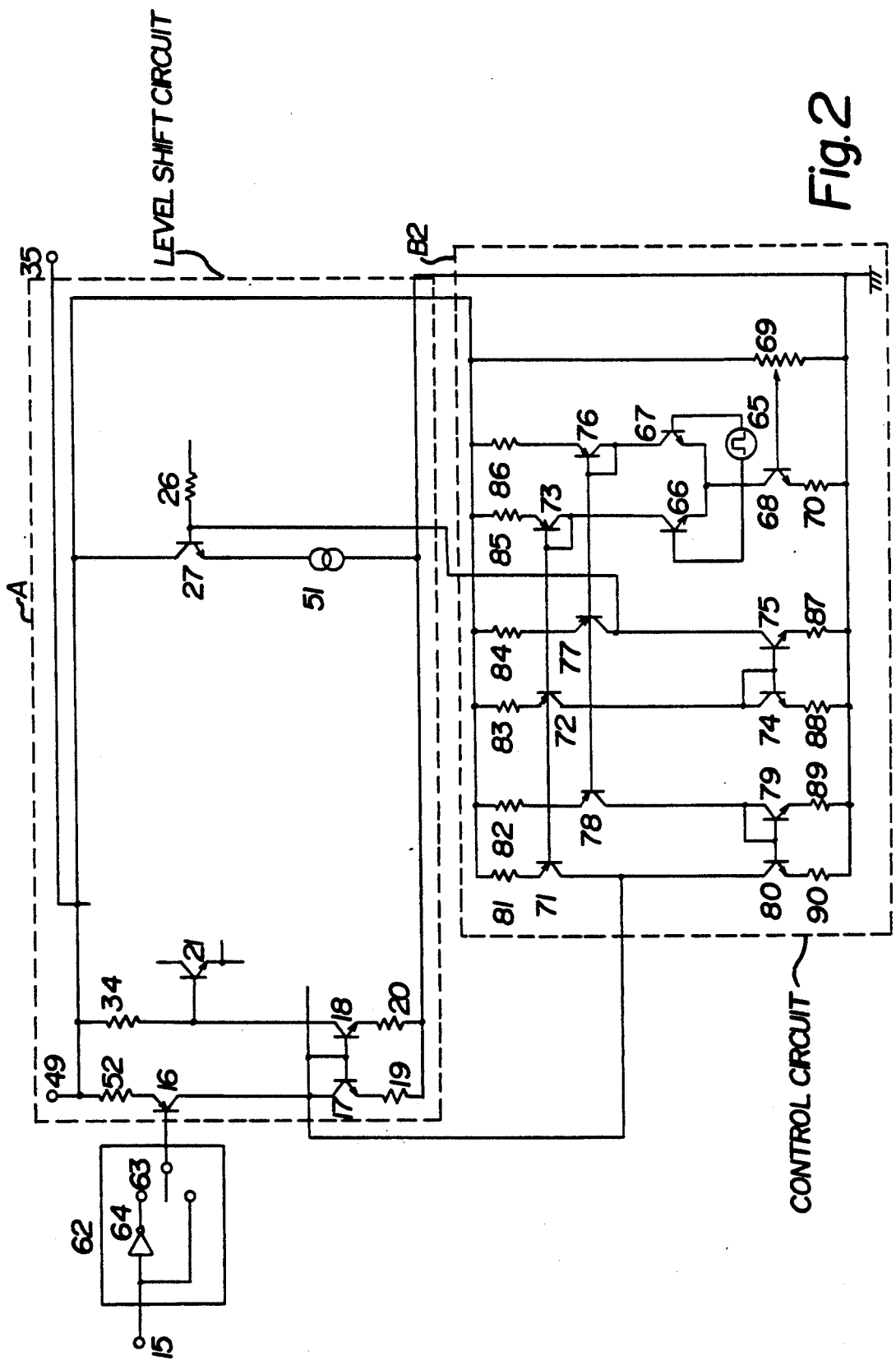
Figure 3A:
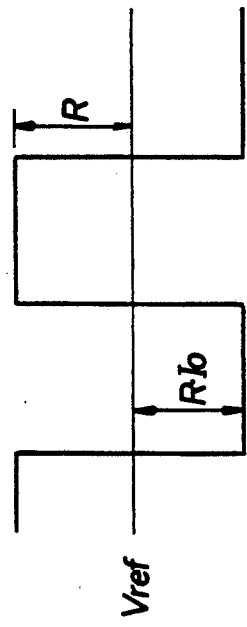
Figure 3B:
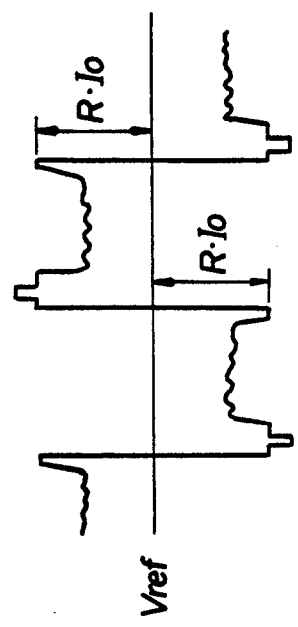

The following description will discuss the second embodiment of the present invention with reference to FIGS. 2 and 3.

It is noted that a level shift circuit A in FIG. 2 is the same as the level shift circuit A in FIG. 1.

FIG. 2 shows a first arrangement in which the polarity of an input video signal is inverted.

Figure 8:

In FIG. 2, a polarity inverting circuit 62 for inverting the polarity of an input video signal for every line is disposed between an input terminal 15 and the base of a transistor 16. When a switch 63 of the polarity inverting circuit 62 is switched, an input signal of the base of the transistor 16 is alternately switched to the video signal at the input terminal 15 and the video signal of which polarity is being inverted by an inverter 64. Thus, the polarity of the input video signal of the base of the transistor 16 is inverted for every line as done in, for example, a video signal shown in FIG. 8.

In a control circuit B2 disposed instead of the control circuit B1 in FIG. 1, a pulse generator 65 causes transistors 66, 67 forming a differential pair to be alternately turned ON synchronously with the switching operation of the switch 63.

A transistor 68 for a constant-current source is disposed in a common emitter circuit of the transistors 66, 67, and the amounts of currents flowing in transistors 68, resistance 70 are set by a variable resistance 69.

When the transistor 66 is turned ON, a current in a current mirror circuit of transistors 71, 72, 73 equivalent to the transistors 41, 44, 45 in FIG. 1 is increased. At this time, due to the superposition of a direct current produced by a current flowing in the transistor 71, the emitter voltage of the transistor 21 is decreased to lower the direct current level of the input video signal.

Due to an increase in the current flowing in the transistor 72, a current in a current mirror circuit of transistors 74, 75 equivalent to the transistors 40, 46 in FIG. 1 is increased. This decreases the base voltage of a transistor 27 to lower the level of the reference signal.

On the other hand, when the transistor 67 is turned ON, a current in a current mirror circuit of transistors 76, 77, 78 is increased. At this time, based on an increase in the current flowing in the transistor 78, a current in a current mirror circuit of transistors 79, 80 is increased and a current is supplied from a current mirror circuit of transistors 17, 18 to the transistor 80. This increases the emitter voltage of a transistor 21 and the direct current level of the input video signal.

Based on an increase in the current flowing in the transistor 77, the base voltage of the transistor 27 is increased. This increases the emitter voltage of the transistor 27 to increase the level of the reference signal.

It is now supposed that the base voltage of a transistor 28 with no control circuit B2 disposed, is shown by Vref in FIG. 3 (a), and a current flowing in the transistor 68 and the resistance value of the resistance 70 are respectively expressed by Io and R. When the transistors 66, 67 are switched, the base voltage of the transistor 28 varies synchronously with the polarity inversion of the input video signal, as shown in FIG. 3 (a).

The direct current to be superposed on the input video signal varies with the level variation of the reference signal, and the positive/negative pedestal level of the input video signal is corrected in an amount corresponding to the level variation of the reference signal. Accordingly, the base voltage of a transistor 23 varies, for example, as shown in FIG. 3 (b).

Based on the level variation of the reference signal, a direct current is superposed on the input video signal such that the pedestal level of the input video signal is corrected in an amount corresponding to the level variation of the reference signal. Accordingly, the level variation of the preset reference signal exerts no influence to the level shift amount in the level shift circuit A, likewise in the arrangement in FIG. 1.

Accordingly, even though the input video signal is changed in polarity, for example, for every line, the video signal at an output terminal 35 is changed with the direct current level thereof quickly following the level variation of the reference signal, and the pedestal level of the input video signal is quickly controlled to the level of the reference signal.

By adjusting the resistance 69, the pedestal level of the video signal at the output terminal 35 is adjusted to achieve a so-called bright adjustment.

In FIG. 2, there are disposed bias resistances 81 to 90, and reference signal changing means is formed by the pulse generator 65, the transistors 66 to 68, and the like.

Third Embodiment

Figure 4:
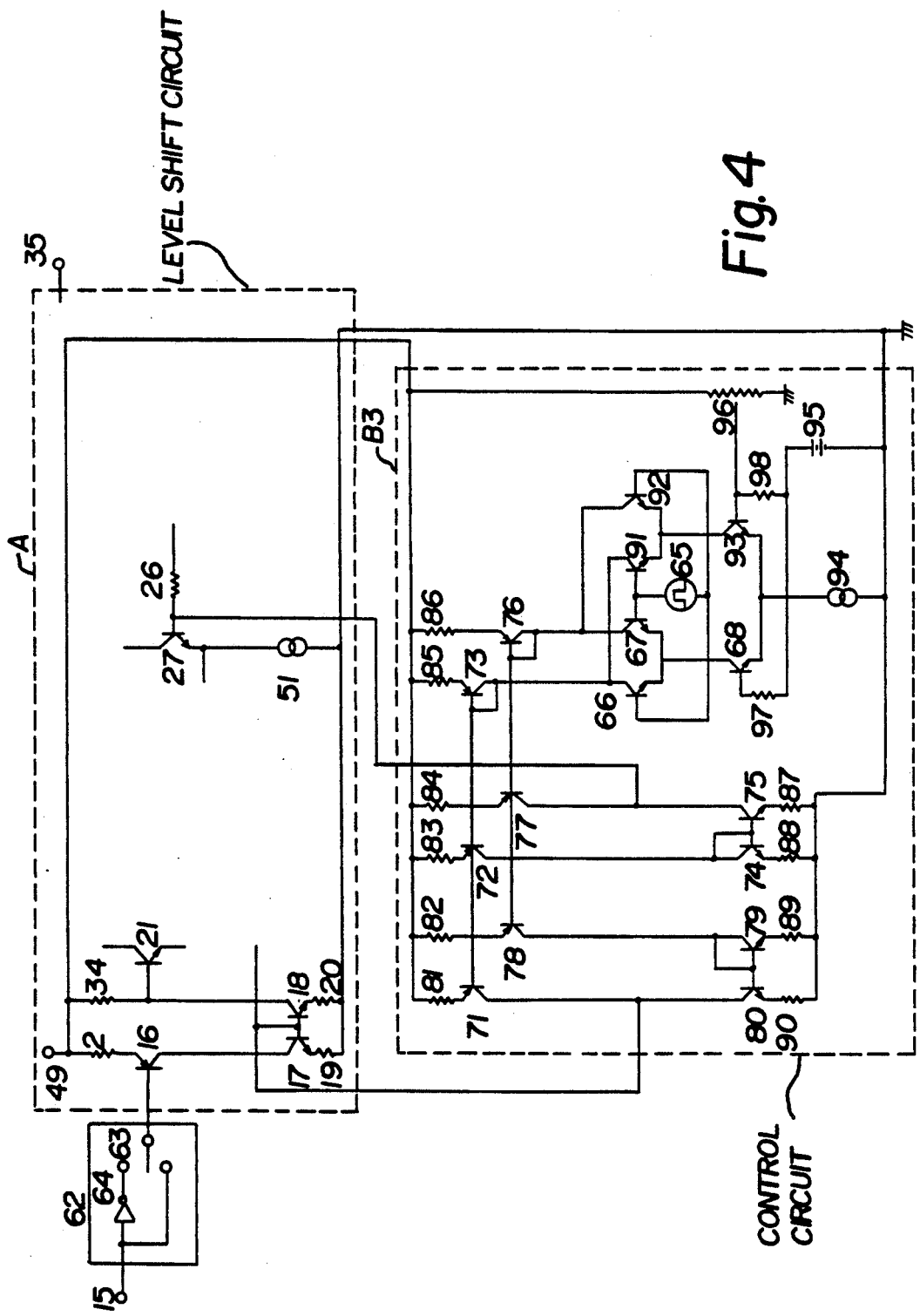
Figure 5A:
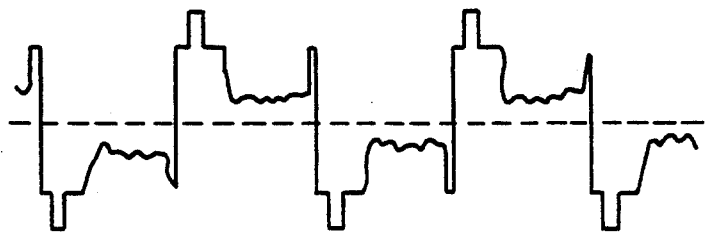
Figure 5B:
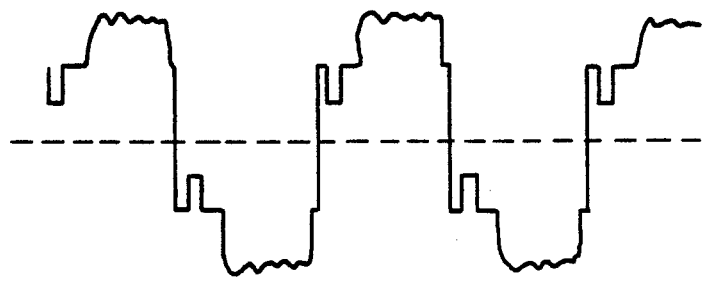
Figure 5C:
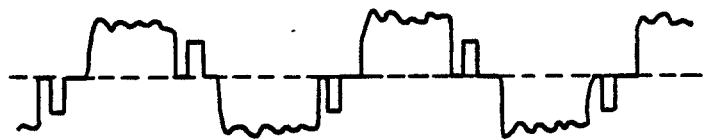
Figure 6:
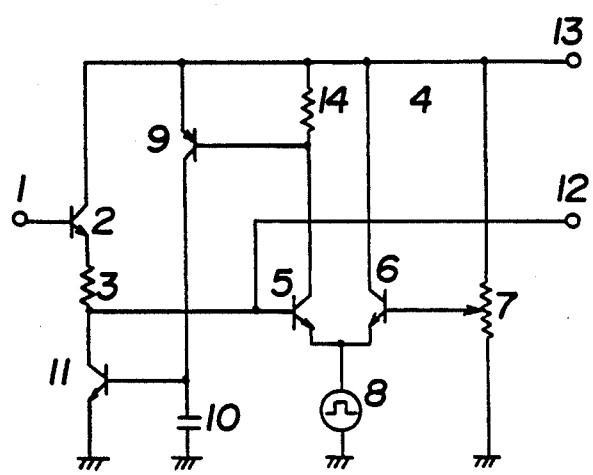
FIG. 6 is a connection diagram of a conventional direct current restorer.

The following description will discuss the third embodiment of the present invention with reference to FIGS. 4 and 5.

FIG. 4 shows a second arrangement in which the polarity of an input video signal is inverted. The arrangement in FIG. 4 differs from the arrangement in FIG. 2 in the following points.

Disposed instead of the control circuit B2 in FIG. 2 is a control circuit B3 including, as reference signal changing means, (i) transistors 91, 92, 93 having the same arrangement of transistors 66 to 68, (ii) a constant-current source 94 for a common emitter circuit of the transistors 68, 93, (iii) a bias power supply 95 for the bases of the transistors 68, 93, and (iv) a bias adjusting variable resistance 96 for changing the base bias of the transistor 93.

Thus, the arrangement in FIG. 4 may be so switched, with a simple adjustment, as to be applied to a drive circuit for both-type liquid crystal panels, i.e., a liquid crystal panel of the normally black type in which light transmits when an electrode voltage is applied, and a liquid crystal panel of the normally white type in which light transmits when no electrode voltage is applied.

It is now supposed that a pulse generator 65 causes the transistors 66, 67 and the transistors 91, 92 to be interlockingly operated synchronously with the polarity inversion of the input video signal, and the current of the constant-current source 94 is set to Io' and the base voltages of the transistors 68, 93 are equal to each other. In this case, a current of Io'/2 flows in each of the transistors 68, 93 without any switching operation of the transistors 66, 67 and the transistors 91, 92.

Further, when the transistors 66, 92 are turned ON and OFF, the transistors 67, 91 are turned OFF and ON. Accordingly, if the current flowing in each of the transistors 68, 93 is equal to Io'/2, a current in a current mirror circuit of transistors 71 to 73 and a current in a current mirror circuit of transistors 76 to 78 are equal to Io'/2 without any switching operation of the transistors 66, 67 and the transistors 91, 92.

At this time, the control circuit B3 produces neither change in the direct current level of the input video signal nor change in the level of the reference signal.

It is now supposed that the resistance 96 is set such that the base voltage of the transistor 93 is higher than the base voltage of the transistor 68. For example, it is supposed that a current of ($\frac{2}{3} \times$Io') flows in the transistor 68 and a current of ($\frac{1}{3} \times$Io') flows in the transistor 93. In this case, when the transistors 66, 92 are turned ON, a current flowing in the current mirror circuit of the transistors 71 to 73 is equal to ($\frac{2}{3} \times$Io'), and a current flowing in the current mirror circuit of the transistors 76 to 78 is equal to ($\frac{1}{3} \times$Io').

Accordingly, the current of ($\frac{1}{3} \times$Io') in the transistor 71 flows in a current mirror circuit of transistors 17, 18 and the base current of a transistor 75. At this time, when the values of resistances 26, 34 are expressed by R', the levels of the reference signal and the input video signal are lowered in an amount of ($\frac{1}{3} \times$Io'$\times$R').

On the contrary, when the transistors 67, 91 are turned ON, the levels of the input video signal and the reference signal are increased in an amount of ($\frac{1}{3} \times$Io'$\times$R').

On the other hand, when the resistance 96 is set such that the base voltage of the transistor 93 is lower than the base voltage of the transistor 68, the levels of the input video signal and the reference signal are increased when the transistors 66, 92 are turned ON, and the levels of the reference signal and the input video signal are lowered when the transistors 67, 93 are turned ON.

More specifically, the relationship in size between the base voltages of the transistors 68, 93 may be changed by adjusting the resistance 96. This enables to readily change the directions of the level variations of the reference signal and the input video signal with respect to the polarity of the input video signal.

When the voltage of the video signal at the output terminal 35 is used as an electrode voltage for a liquid crystal panel, the input video signal presents a waveform as shown in FIG. 5 (a) for the normally white type and a waveform as shown in FIG. 5 (b) for the normally black type. That is, the polarity inversion of the input video signal is reversed according to the type of the liquid crystal panel.

Accordingly, the resistance 96 may be adjusted according to the type of the liquid crystal panel. That is, the base voltage of the transistor 93 is set to a value higher than the base voltage of the transistor 68 for the normally white type, and the base voltage of the transistor 93 is set to a value lower than the base voltage of the transistor 68 for the normally black type.

At this time, the emitter voltage of the transistor 21, i.e., the input video signal of the base of the transistor 23 in FIG. 1 presents a waveform shown in either FIG. 5 (a) or FIG. 5 (b) in which a direct current suitable for the type of a liquid crystal panel used is being superposed.

When the base voltages of the transistors 68, 93 are equal to each other, the input video signal of the base of the transistor 23 presents, for example, a waveform shown in FIG. 5 (c).

In FIG. 4, the base input resistances of the transistors 68, 93 are generally designated by reference numeral 97, 98.

According to the arrangement in FIG. 4 too, based on the level variation of the reference signal, a direct current is superposed on the input video signal such that the pedestal level of the input video signal is corrected in an amount corresponding to the level variation of the reference signal. Accordingly, the arrangement in FIG. 4 achieves an operational effect similar to that in the arrangement in FIG. 2. Further, by adjusting the resistance 96, the variation characteristics of the reference signal and the input video signal may be changed according to, for example, the type of a liquid crystal panel. Thus, the arrangement in FIG. 4 may be used as a drive circuit for both liquid crystal panels of the normally white type and the normally black type.

The bright level may also be adjusted by adjusting the resistance 96 in such an extent that the relationship between the base voltages of the transistors 68, 93 is not changed.

What is claimed is:

1. In a direct current restorer in which an input video signal is compared with a pedestal level setting reference signal for every pedestal period, and, based on difference between the pedestal level of said input video signal and the level of said reference signal, the direct current level of said input video signal is shifted, said direct current restorer comprising direct current superposing means for superposing a direct current according to the level variation of said reference signal, on said input video signal so that the direct current level of said input video signal is corrected according to the level variation of said reference signal.

2. A direct current restorer as set forth in claim 1, wherein the direct current superposing means includes a variable resistance for adjusting the level of the reference signal, and a current mirror circuit for superposing a direct current according to an adjustment value of said variable resistance, on the input video signal.

3. A direct current restorer as set forth in claim 1, further comprising, at a primary stage, a polarity inverting circuit for periodically inverting the polarity of the input video signal, and wherein the direct current superposing means includes (i) reference signal changing means formed by a differential pair of transistors for changing the level of the reference signal synchronously with the inversion of the polarity of said input video signal and (ii) a current mirror circuit for superposing a direct current according to an output of said reference signal changing means, on said input video signal.

4. A direct current restorer as set forth in claim 3, wherein the reference signal changing means includes (i) a differential pair of transistors of which output variation directions are reverse to each other, and (ii) a bias adjusting variable resistance for changing the bias settings of said differential pair of transistors, thereby to adjust the variation directions of the direct currents of the current mirror circuit and the reference signal with respect to the change in the polarity of the input video signal.

* * * * *